United States Patent [19]

Woollenweber et al.

[11] Patent Number: 4,918,923

[45] Date of Patent: Apr. 24, 1990

[54] INTERNAL COMBUSTION ENGINE TURBOSYSTEM AND METHOD

[76] Inventors: William E. Woollenweber, 3169 Camino del Arco, La Costa, Calif. 92009-7856; Niels J. Beck, 4073 The Hill Rd., Bonita, Calif. 92109

[21] Appl. No.: 201,919

[22] Filed: Jun. 6, 1988

Related U.S. Application Data

[63] Continuation-in-part of Ser. No. 159,840, Feb. 24, 1988.

[51] Int. Cl.⁵ .............................. F01P 3/20; F02G 3/02
[52] U.S. Cl. .......................................... 60/597; 60/599; 60/614; 123/41.49
[58] Field of Search ...................... 60/597, 599, 605.1, 60/605.3, 607, 608, 614, 602; 123/41.11, 41.12, 41.42, 46.65, 41.49, 196 AB, 563

[56] References Cited

U.S. PATENT DOCUMENTS

| | | | |
|---|---|---|---|
| 1,244,442 | 10/1917 | Frazer | 123/41.49 |
| 1,277,735 | 9/1918 | La Porte | 60/597 |
| 2,874,642 | 2/1959 | Forrest . | |
| 2,944,786 | 7/1960 | Angell et al. . | |
| 3,104,520 | 9/1963 | Cazier et al. | 60/602 |
| 3,137,477 | 6/1964 | Kofink . | |
| 3,557,549 | 1/1971 | Webster . | |
| 3,614,259 | 10/1971 | Neff | 415/205 |
| 3,796,047 | 3/1974 | Crook et al. | 60/612 |
| 3,829,235 | 8/1974 | Woollenweber, jr. | 415/143 |
| 3,946,565 | 3/1976 | Cutler | 60/599 |
| 3,994,620 | 11/1976 | Spraker, Jr. et al. | 415/145 |
| 4,010,613 | 3/1977 | McInerney | 60/599 |
| 4,171,936 | 10/1979 | Hageman et al. | 60/602 X |
| 4,177,005 | 12/1979 | Bozung et al. | 415/128 |
| 4,565,505 | 1/1986 | Woollenweber | 417/407 |
| 4,653,275 | 3/1987 | Sumser et al. | 60/602 |
| 4,708,095 | 11/1987 | Luterek | 123/41.42 |

FOREIGN PATENT DOCUMENTS

| | | | |
|---|---|---|---|
| 2633587 | 2/1978 | Fed. Rep. of Germany | 60/602 |
| 1228357 | 3/1960 | France | 123/41.49 |

OTHER PUBLICATIONS

Brockington, Paul, "Perkins Apply Charge Cooling to Turbocharged 6.354", *Commercial Motor, Sep. 4, 1970.*
Haggh, Bertil and Ernst Holmer, "Air-To-Air Charge Air Cooling for Truck Engines", Technical Paper distributed at Society of Automotive Engineers, Inc., West Coast International Meeting, Aug. 6-9, 1979, SAE 790 770.

Primary Examiner—Michael Koczo
Attorney, Agent, or Firm—Willian Brinks Olds Hofer Gilson & Lione

[57] ABSTRACT

An exhaust-driven cooling system for an internal combustion engine includes a turbocooler having an exhaust-driven turbine and ducted fan means to generate a flow of cooling air for use in an internal combustion engine heat exchanger to dissipate heat losses of the engine and a control for the generation of cooling air. The system can provide internal combustion engines with substantially reduced temperatures and pressures for its exhaust gas, thrust usable as a motive force and exhaust system components and substantially improved reliability and efficiency.

11 Claims, 5 Drawing Sheets

INTERNAL COMBUSTION ENGINE TURBOSYSTEM AND METHOD

This application is a continuation-in-part of U.S. patent application Ser. No. 159,840 filed Feb. 24, 1988.

TECHNICAL FIELD

This invention relates to exhaust-driven turbo-cooling systems in internal combustion engines and to the use of turbocompounding, including plural turbomachines and heat exchangers, in internal combustion engine systems to provide engine cooling and cooled charge-air to an engine for combustion.

BACKGROUND ART

Substantial heat losses are generated in the operation of an internal combustion engine, and these heat losses must be removed from the engine and dissipated to prevent engine temperatures that can destroy engine lubrication and parts. Water-to-air heat exchangers, commonly called "radiators", are predominantly used to cool internal combustion engines; and water or a water and antifreeze mixture is circulated through the engine as an engine-cooling fluid to absorb, through the inner surfaces of the internal combustion engine, the heat loss generated in the operation of the engine. The heated water is then delivered to the water-to-air heat exchanger or radiator where the heat is transferred from the water to air flowing through an engine radiator. The engine radiator is most frequently located in a position on the vehicle where air can be directed through the heat exchanger as a result of movement of the vehicle driven by the internal combustion engine. Because internal combustion engines are operated while stationary and in vehicles which are not in motion, an engine-driven fan is used to create air flow through the heat exchanger. With the internal combustion engines of vehicles, the radiator is most frequently positioned in front of the engine; and the fan is driven from the crank shaft of the engine. The efficiency of such fans is low, usually in the range of twenty-five percent due to poor blade design and poor air flow around the fan; and such fans drain engine power and reduce the overall efficiency of an engine.

Such water-cooled engines present the further disadvantage of an additional coolant, water, in addition to the oil that is used to lubricate the engine. Water, of course, freezes at 32° F. (0° C.); and the internal combustion engine must be protected against the expansion of freezing water by adding antifreeze into the water. Notwithstanding such protective actions, the use of water, or for that matter, any additional coolant, introduces into the internal combustion engine a further source of unreliable operation. Water introduces a source of corrosion, rust, and cylinder liner cavitation into the engine, and requires additional engine accessories such as pumps, radiators, hoses, belts, and fans.

Fuel consumption and power output are important factors in the operation of an internal combustion engine. The performance of an internal combustion engine can be improved by the introduction of a greater quantity of charge-air, i.e., oxygen available in the combustion chambers of the engine cylinders for combustion. A greater quantity of oxygen in the air-fuel mixture permits more complete combustion, resulting in a greater power output for the engine, better fuel economy, and a reduction in the level of noxious emissions, such as residual hydrocarbons and carbon monoxides present in the exhausted gases.

Volumetric efficiency is a measure of the actual quantity of charge-air in the combustion chamber of an internal combustion engine at the end of the intake stroke relative to the amount of charge-air that could be in the chamber under normal atmospheric conditions. Non-supercharged engines must necessarily have a volumetric efficiency of less than one hundred percent because of the expansion of the charge-air in the combustion chamber due to its heating prior to the closing of the intake valve or valves and the inability to reach atmospheric pressure in the combustion chamber because of air pressure losses due primarily to the restricted intake valve openings. An increase in the volumetric efficiency of an internal combustion engine increases its overall operating efficiency.

One common method of increasing the air quantity available in the engine cylinder combustion chambers is supercharging the combustion chambers through the use of one or more turbochargers. Another method is through the use of a charge-air cooler to cool the charge-air introduced into the chamber, thereby increasing the density of the air and the amount of oxygen to be introduced into the combustion chamber. A further method is using quick opening cams and multiple intake valves in each cylinder to reduce the throttling loss through the intake valves. Such methods increase the volumetric efficiency of an engine.

A turbocharged engine uses an exhaust-driven turbine coupled with a centrifugal compressor to compress ambient air to pressures above atmospheric pressure and to supply the compressed charge-air to the combustion chambers of the cylinders of the engine. This compression process increases the temperature of the air, and it is advantageous to use an aftercooler to cool the charge-air and further increase its density immediately prior to its introduction into the combustion chamber.

Charge-air cooling significantly improves the overall performance of an engine and has been in use for many years. Cooling of the charge-air after its compression by a turbocharger provides a higher charge-air weight to the combustion chamber, allowing the engine to burn more fuel, increasing the power output, improving fuel consumption, decreasing exhaust temperature, decreasing undesirable exhaust emissions, and so on. The lower starting temperature for the combustion process brought about by charge-air cooling can increase the life for the exhaust system, including the turbocharger, and can reduce the mechanical and thermal loads placed on the engine.

Various types of heat exchangers have been used with internal combustion engines to lower the temperature of the charge-air. Coolant-to-air heat exchangers are a type which uses the coolant fluid circulated through the engine block. The engine coolant most often used in a coolant-to-air-type aftercooler is water or a water and antifreeze mixture. In a coolant-to-air-type heat exchanger, however, the temperature of the engine coolant is normally high; and the high temperature of the coolant limits the temperature to which the charge-air can be cooled. Air-to-air heat exchangers are another type which use a flow of ambient air induced through the heat exchanger by vehicle motion or by an engine-driven fan to cool the charge-air. In an air-to-air-type heat exchanger, the lower temperature ambient air is used for cooling; and the temperature of the charge-air can generally be reduced to a level only 35–54° F.

(20°–30° C.) higher than the initial ambient air temperature.

In a turbocharged engine, the cooling air needed to cool the charge-air may be supplied by extending the inducer blades of the turbocharger compressor and ducting the air from the blade extensions through a separate ductway on the turbocharger to the charge-air aftercooler. Such a system is described in U.S. Pat. No. 3,829,235. A dual outlet compressor produces both the compressed charge-air and the cooling air flow to an air-to-air aftercooler for the charge-air. This system can provide quantities of cooling air for the charge-air to be provided to internal combustion engine cylinders; however, it is not capable of providing large volumes of cooling air required for other heat exchangers that may be used on an internal combustion engine.

DISCLOSURE OF INVENTION

This invention provides an exhaust-driven cooling system for an internal combustion engine system and, in a preferred embodiment, provides an "oil-only", internal combustion engine system with an exhaust-driven cooling system.

An internal combustion engine system of this invention includes a multi-cylinder internal combustion engine assembly, means for carrying its combusted fuel-air mixture ("exhaust gas") from the internal combustion engine assembly, and means for providing a flow of coolant from the engine to a heat exchanger to dissipate engine heat losses carried by the coolant prior to return of the coolant to the internal combustion engine assembly. In the invention, a "turbocooler" has a turbine connected with the means for carrying the exhaust gas from the internal combustion engine assembly so that the exhaust gas drives the turbine of the turbocooler. The turbocooler also has a fan means turned by the turbine of the turbocooler which communicates with ambient air and generates a flow of cooling air. The internal combustion engine system is further provided with means to direct the flow of cooling air generated by the turbocooler fan means through the heat exchanger to cool the coolant and dissipate the heat generated in operation of the internal combustion engine assembly.

In a preferred embodiment of this invention, oil is used both as a lubricant and a coolant, providing an "oil-only", internal combustion engine assembly; and the engine system is provided with means for providing a flow of lubricant to and from the engine assembly for lubrication and for carrying heat losses generated by the operation of the engine assembly away from the engine assembly and to an oil cooler which serves as the coolant and lubricant heat exchanger. The cooling air generated by the turbocooler fan means is directed through the oil cooler to cool the lubricant and dissipate the heat generated in operation of the engine assembly. This preferred embodiment of the invention eliminates water (and its disadvantages) as a coolant and provides an internal combustion engine system with a single working fluid (other than the fuel/air mixture used to drive the engine). In marine or amphibious applications, the need for salt water coolant may be eliminated.

In a further embodiment of the invention, the cooling air generated by the turbocooler fan means is directed from the coolant heat exchanger, or, in the preferred embodiment, oil cooler, back to the engine exhaust system; and the engine exhaust system is adapted to mix the cooling air with the engine exhaust prior to its leaving the exhaust system. With such improved internal combustion engine systems, the exhaust gas temperature can be reduced below 500° F. (260° C.), thereby substantially reducing its infrared emissions, making it harder to detect with infrared sensors. The internal combustion engine systems of this invention thus may be substantially advantageous in supplying motive power to military vehicles.

The invention may be incorporated into existing internal combustion engines by the addition of a separate turbocooling device. Such a turbocooling device has a turbine and a fan means coupled by a common rotatable shaft. The turbine and fan means of the turbocooling device may be designed to optimize their performance in using engine exhaust gas to produce a substantial flow of cooling air. The turbo-cooling device may be provided with connections permitting it to be incorporated conveniently into an existing internal combustion engine. For example, the turbocooling device can be provided with a turbine inlet adapted to be connected to the exhaust of the internal combustion engine and to direct the internal combustion engine exhaust to its turbine. The turbo-cooling device can also be provided with an inlet for its fan means adapted to be connected with ambient air and provided, if necessary, with a coarse air filter and an outlet adapted to be connected with means to direct the flow of cooling air to the internal combustion engine. The turbocooling device can also be provided with an exhaust for the turbine adapted to be connected with a cooling air return from the internal combustion engine and further adapted to mix the cooling air and exhaust from the turbine or otherwise cool the exhaust of the turbocooler turbine.

In systems of the invention, the cooling air generated by the fan means of a turbocooler can also be used to cool charge-air generated by a turbocharger or turbochargers used with the internal combustion engine assembly by providing the system with one or more charge-air coolers and means to direct the cooling air generated by the fan means of the turbocooler through the charge-air cooler or coolers. In preferred embodiments of systems including such charge-air cooling, ambient air is first drawn through an air cleaner and through the charge-air cooler or coolers by the fan means of the turbocooler before it is directed from the turbocooler for other uses, thereby providing the charge-air cooler or coolers with cooling air at or near the lowest possible temperature. The invention may further provide a system for supercooling the charge-air from a turbocharger or turbochargers that may be easily added to existing internal combustion engine systems. Such systems may include a first charge-air cooler, an additional turbomachine, frequently referred to as a charge-air compressor-expander, including a conventional compressor and an expander device, and a second charge-air cooler. In this system of the invention, compressed charge-air is delivered from the turbocharger(s) to the first charge-air cooler; and the system is provided with means to direct cooling air from the turbocooler fan means to the first charge-air cooler to cool the compressed charge-air, and means for delivering cooled compressed charge-air from the first charge-air cooler to the compressor of the charge-air compressor-expander where the compressor further compresses the charge-air. This system further includes means for delivering the further compressed charge-air from the compressor of the charge-air compressor-expander to the second charge-air cooler, means to direct cooling air from the turbocooler fan means to the second charge-air cooler for cooling the further compressed charge-air, and means for delivering the cooled, further compressed charge-air to the expander of the charge-air compressor-expander. The cooled, further compressed charge-air expands through the expander of the charge-air compressor-expander, further cooling the charge-air and driving the compressor of the charge-air compressor-expander. Finally, means are provided in the system for delivering the additionally cooled charge-air from the expander of the charge-air compressor-expander to the combustion chambers of the internal combustion engine. This system of the invention thus provides supercooled and compressed charge-air o the engine combustion chambers to substantially increase the weight of air and the quantity of oxygen available for combustion of the fuel-air mixture. The temperature of the supercooled charge air can be reduced to values below ambient temperature and can serve to further reduce the operating temperature of engine components such as pistons and exhaust valves.

In an even further embodiment of the invention, the volume of the cooling air flow generated by the turbocooler fan means may be controlled in accordance with the cooling requirements of the engine. For example, the cooling requirements for the engine may be determined by monitoring the engine coolant temperature and providing increased cooling air flow during periods of high engine output when the coolant temperature is above a predetermined level. When the ambient temperature is low and the engine load is light, very little, if any, cooling air is needed. As the engine load increases, the coolant temperature also increases and when it reaches a predetermined level, the turbocooler can be activated by a temperature-actuated control device monitoring the engine coolant temperature to provide increased cooling to the engine.

One method of controlling the cooling air flow generated by the turbocooler is to employ a waste gate valve, which may be incorporated into the turbocooler. Such a waste gate, for example, may be normally held in an opened position, allowing exhaust gas to bypass the turbocooler turbine during periods of light engine loads when a large quantity of cooling air is not needed, and closed by a control to direct exhaust gas through the turbocooler turbine. The waste gate valve may also regulate the volume of exhaust gas acting on the turbocooler turbine and, thus, control the volume of the cooling air flow provided to keep the coolant temperature within prescribed limits.

When engine load is high, the engine requires a high cooling air flow from the turbocooler. During these periods the engine is also running at high speed and if a turbocharger is employed, a high boost pressure is produced. Fluid pressure from the internal combustion engine can be used to operate the waste gate, and preferably, engine boost pressure may be used to actuate the waste gate. A device may be employed to sense the engine coolant temperature and to provide a signal to a control valve in a line delivering the engine boost pressure to means to operate the waste gate valve. During periods of engine operation when the coolant is hot, the control valve is opened, allowing boost pressure to be delivered to the operating means for the waste gate valve. With the turbocooler waste gate closed, exhaust gas is directed substantially entirely to the turbocooler turbine, driving the turbocooler fan and generating the cooling air flow needed for the cooling of the engine.

The waste gate valve may be controlled by a variety of means. For example, engine oil pressure may be employed rather than engine boost pressure. In this event, a three-way control valve may be used to control application of engine oil pressure to a waste gate operating means, with a conduit returning the oil back to the engine. Moreover, a fluid pressure control is not essential to the invention. The waste gate valve operating means may comprise a solenoid actuator controlled by an electric current provided through a temperature-activated device. The waste gate operating means may also be incorporated into the turbocooler. In a further possible embodiment, the waste gate valve may be activated mechanically or electrically at the discretion of the vehicle operator by triggering an activating switch accessible to the operator, i.e., a dashboard control or the like.

The total combined flow of the exhaust gas and the cooling air flow may also be used as a means of increasing the motive force acting on the vehicle. The cooling air flow is generally in the order of four-times the engine air flow in quantity. The cooling air flow may be mixed with the exhaust gas to reduce its exit temperature prior to the exhaust gas being expelled from the engine, and the combined volumes of the exhaust gas and the cooling air flow may produce a significant thrust force if it is directed rearwardly of the vehicle. This will increase the overall operating efficiency of the engine by either reducing engine fuel consumption or increasing vehicle speed or both.

An internal combustion engine system including all the above features of the invention includes an internal combustion engine assembly using only oil as both the lubricant and coolant, thereby eliminating the use of an additional coolant, generally water, and the attendant disadvantages. The engine is cooled by an exhaust-driven turbocooler. Thus, the engine system is provided with an oil cooler and means to pump oil from the engine to the oil cooler and, after the oil is cooled, back to the engine. Means are provided to direct the exhaust gas to the turbocooler turbine so that it drives the turbine and fan means of the turbocooler at various engine speeds. As the turbocooler fan means is driven by the action of the engine exhaust gases on the turbocooler turbine, the turbocooler fan means generates a flow of cooling air from the ambient atmosphere that is directed initially to first and second charge-air coolers of a fuel-air system, then to the input of the turbocooler fan means, from the output of the turbocooler fan means to the oil cooler, and from the oil cooler back to a portion of the exhaust system adjacent the turbocooler where the cooling air is finally used to mix with and cool the exhaust gas from the turbocooler turbine prior to its release to the atmosphere. Means are further provided to control the cooling air flow generated by the turbocooler fan means. Control of the cooling air flow may be effected by controlling the volume of engine exhaust gas directed to act upon the turbocooler turbine. Cooled charge-air for the combustion chambers of the internal combustion engine is generated by one or more turbochargers which direct compressed charge-air to the first charge-air cooler, from the first charge-air cooler to the compressor of a charge-air compressor-expander, from the compressor of the charge-air compressor-expander to the second charge-air cooler, from the second charge-air cooler to the expander of the charge-air compressor-expander, and then from the expander of the charge-air compressor-expander expander to the combustion chambers of the internal combustion engine. Through the interaction of the cooling air from the turbocooler with the first and second charge-air coolers and the charge-air compressor-expander, the combustion cylinders of the internal combustion engine are provided with supercooled charge-air, increasing the ability of the engine to use more fuel more efficiently, increasing the power output of the engine, reducing the exhaust gas temperature and undesirable exhaust emissions, and providing an improvement in the life of the engine and its accessories as a result of the more efficient and reliable operation of the internal combustion engine.

BRIEF DESCRIPTION OF DRAWINGS

Preferred embodiments of this invention are described below in connection with the accompanying drawings, in which.

BEST MODE FOR CARRYING OUT THE INVENTION

Figure 1:
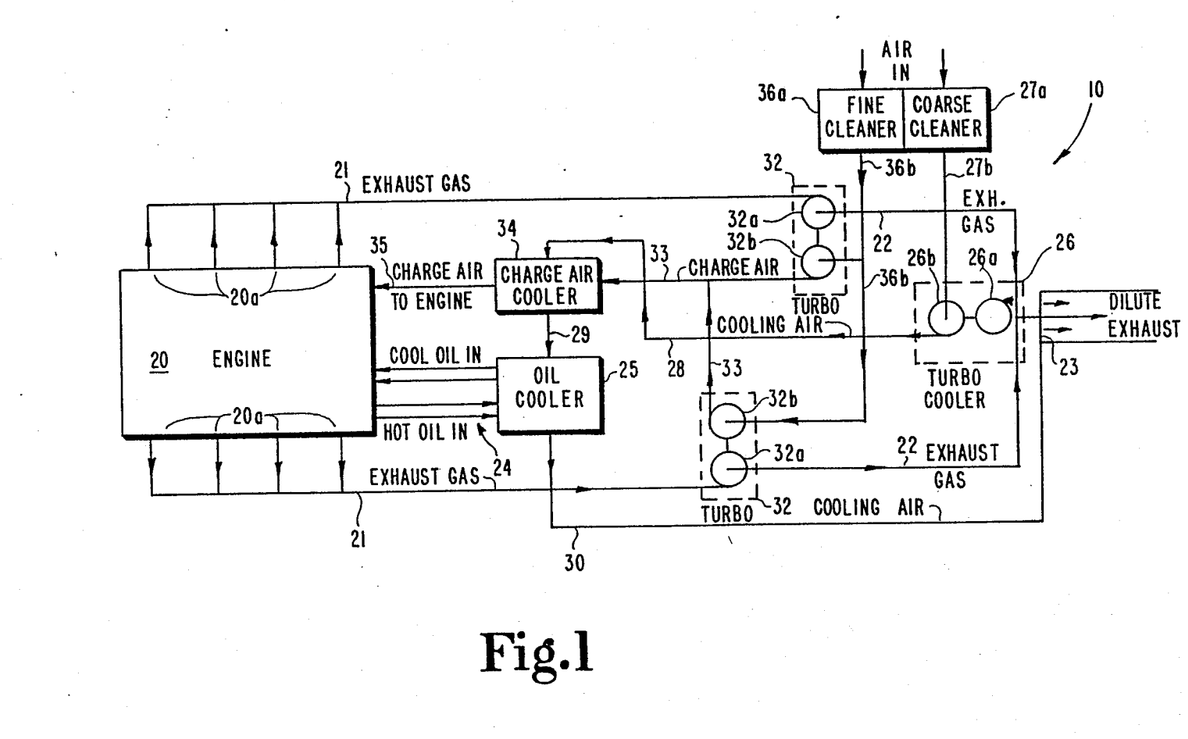
FIG. 1 is a schematic representation of an internal combustion engine system of this invention with an exhaust-driven cooling system.

As shown in FIG. 1, an internal combustion engine system 10 of this invention comprises an internal combustion engine assembly 20, means 21, 22, and 23 for carrying exhaust gas, that is, the products of combustion of the fuel/air mixture, from the internal combustion engine assembly, means 24 for providing a flow of coolant to and from the internal combustion engine assembly, a coolant heat exchanger 25 connected with said means 24 for providing a flow of coolant to and from the internal combustion engine assembly 20, a turbocooler 26 having a turbine 26a connected with the means for carrying exhaust gas from the internal combustion engine, and a ducted fan means 26b driven by turbine 26a of turbocooler 26. In the internal combustion engine system of the invention, fan means 26b of the turbocooler communicates with ambient air of the atmosphere through, if necessary, a coarse air cleaner 27a; and the output of turbocooler fan means 26b is connected with means 28, 29 to direct the flow of cooling air generated by turbocooler fan means 26b through coolant heat exchanger 25 to cool the coolant and dissipate heat losses generated in operation of internal combustion engine 20. The system of FIG. 1 further comprises means 30 for directing the cooling air generated by the fan means of the turbocooler from coolant heat exchanger 25 to that portion 23 of the means for carrying the exhaust gas from the internal combustion engine assembly that is adjacent the output of turbocooler turbine 26a. The engine exhaust system portion 23 is adapted to cool the engine exhaust gas from turbocooler turbine 26a with the cooling air from means 30 and to lower its pressure prior to its leaving the exhaust system of the internal combustion engine.

Figure 2:
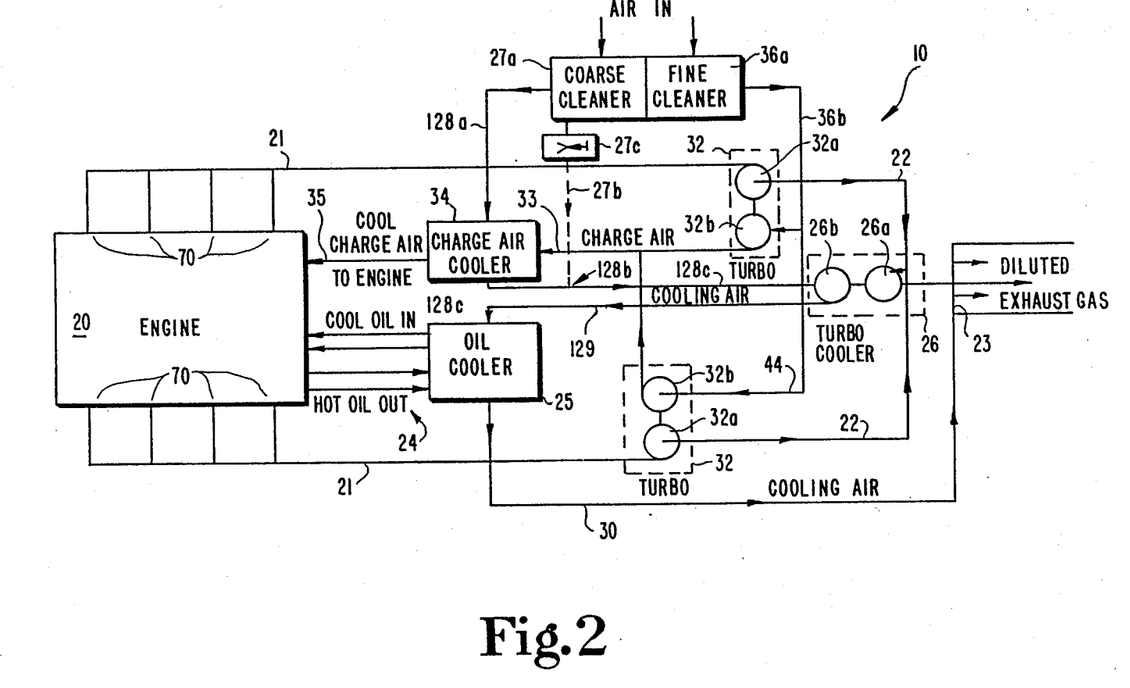
FIG. 2 is a schematic representation of a further internal combustion engine system of this invention with an exhaust-driven cooling system.
Figure 3:
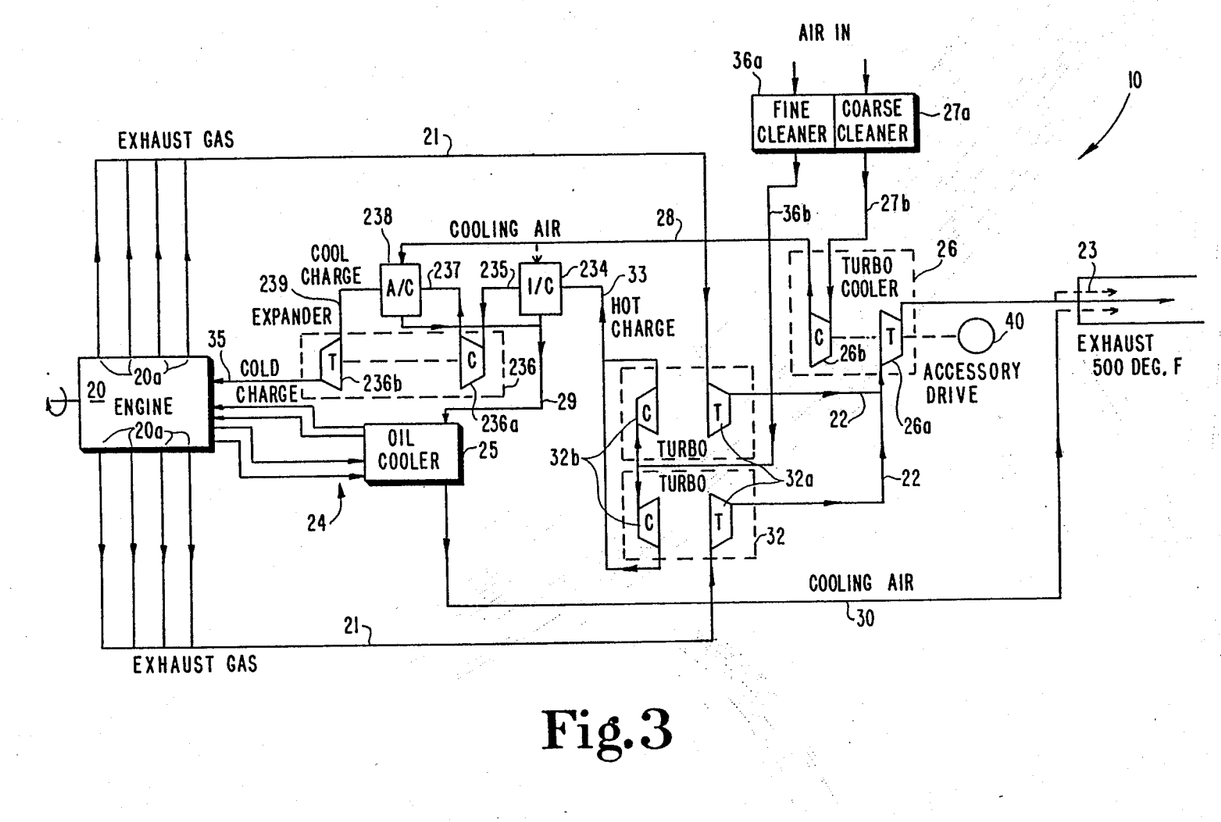
FIG. 3 is a schematic representation of a still further internal combustion engine system of this invention with both an exhaust-driven cooling system and a charge-air supercooling system.

The internal combustion system of FIG. 1 further comprises means for providing a mixture of fuel and air to the internal combustion engine assembly 20. The means for providing a fuel/air mixture to the engine comprises a turbocharger (or in V-type internal combustion engine systems as shown in FIGS. 1-3, two turbochargers) 32 having a turbine or turbines 32a connected with the means for carrying exhaust gas from the internal engine combustion assembly. The turbocharger or turbochargers 32 also have a compressor or compressors 32b that are driven by the turbine or turbines 32a of the turbochargers to create a flow of pressurized charge-air for delivery to cylinders 20a of internal combustion engine assembly 20. For convenience, the one or more turbochargers 32, turbines 32a, and compressors 32b of the described systems are referred to as turbocharger(s), turbine(s), and compressor(s); but such references are understood to mean the one or ore turbochargers and their turbines and compressors that are used with internal combustion engine systems.

Turbocharger(s) 32 may be any turbocharger commonly used in internal combustion engine systems. Such turbochargers generally comprise an exhaust-driven turbine mounted on a common shaft with a centrifugal compressor. When exhaust gas is delivered to the turbine blades of the turbine, the exhaust gas provides a motive force rotating the turbine blades, the common shaft, and the centrifugal compressor. The compressor compresses ambient air present at its inlet above atmospheric pressure and produces a flow of compressed charge-air for delivery to the cylinders of an internal combustion engine. This compression process, however, generates heat in the compressed charge-air; and it is advantageous to remove heat from the compressed charge-air to increase its density prior to introduction into the cylinders of the internal combustion engine. An example of a preferred turbocharger is disclosed in U.S. Pat. No. 4,565,505, the disclosure which is incorporated herein by reference.

Means 33 directs the charge-air outputs of compressor(s) 32b of turbocharger(s) 32 to a charge-air cooler 34. As shown in FIG. 1, a means 28 for directing a flow of cooling air generated by the turbocooler 26 directs the cooling air through charge-air cooler 34 prior to its direction to heat exchanger 25. The cooling air cools the compressed charge-air from turbocharger(s) 32 prior to the direction of the charge-air to cylinders 20a of internal combustion engine assembly 20 through directing means 35. The inputs of compressor(s) 32b of turbocharger(s) 32 are connected with ambient atmosphere through means 36a and 36b, including a fine-air cleaner 36a.

During operation of system 10 shown in FIG. 1, exhaust gas from cylinders 20a of engine 20 is directed through exhaust duct 21 to turbine(s) 32a to drive compressor(s) 32b of turbocharger(s) 32 and, upon leaving turbine(s) 32a, through an exhaust duct 22 to turbine 26a of turbocooler 26. Where, as shown in FIG. 1, the internal combustion engine assembly is a V-type engine, that is, an engine with a V-shaped block having one set of cylinders in one side of the V-shaped block and another set of cylinders in the other side of the V-shaped block, the internal combustion system includes two turbochargers 32 and two sets of exhaust ducts 21 and 22. The exhaust gas from each set of exhaust ducts 22 combine their flows through turbine 26a of turbocooler 26. The exhaust gas drives turbine 26a and fan means 26b of turbocooler 26 and is then expelled through exhaust system portion 23.

Turbocooler 26 draws ambient air through intake means 27a and 27b which may include necessary, a coarse air cleaner 27a. The incoming air is compressed somewhat by fan means 26b of turbocooler 26 and is directed through means 28 to charge-air cooler 34 to cool the charge-air for the combustion chambers of internal combustion engine 20. The fan means 26b of the turbocooler may be designed to provide a pressure increase of about 2 psi. (140 gm/cm$^2$) and an air flow that is several times greater than the exhaust gas flow. The cooling air is further directed through means 29 to heat exchanger or oil cooler 25.

A particularly desirable internal combustion engine system of the invention uses oil for both lubricating and cooling internal combustion engine 20. This particularly desirable embodiment of the invention eliminates the use of water as a coolant and eliminates the radiator/fan combination predominantly used in internal combustion engines to dissipate the heat generated in the operation of the internal combustion engine. Thus, as shown in FIG. 1, means 24 provides a flow of lubricant to and from internal combustion engine assembly 20 for lubricating the internal combustion engine assembly and for carrying heat generated by operation of the internal combustion assembly away from the engine. Heat exchanger 25 is an oil cooler which is connected, as shown in FIG. 1, with the flow of cooling air to cool the lubricant and dissipate the heat carried by the lubricant away from the internal combustion engine prior to the return of the lubricant to the internal combustion engine assembly. The reliability of this improved internal combustion engine assembly is substantially improved by the elimination of water as a coolant, of the corrosive effects of water, of the danger of water freezing and of the need for antifreeze, of the need for an inefficient cooling fan and its energy drain on the engine output, and of the need for the miscellaneous additional spare parts and materials needed in the operation of an engine requiring different fluids for coolant and for lubrication.

As shown in FIG. 1, upon leaving oil cooler or heat exchanger 25, the cooling air is directed through exhaust duct means 30 to a point in the exhaust system of the internal combustion engine system adjacent turbocooler 26. Here, the cooling air is used in exhaust system portion 23 to further cool the hot engine exhaust from turbine 26a of turbocooler 26.

As noted above, in the means for providing a mixture of fuel and air to the internal combustion engine assembly, air is drawn from atmosphere through a fine-air cleaner 36a and further intake means 36b to compressor(s) 32b of turbocharger(s) 32. Compressor(s) 32b produces a flow of compressed charge-air through ducting means 33 to charge-air cooler 34. Charge-air cooler 34 is an air-to-air cooler in which heat is transferred from the compressed charge-air to the cooling air directed through charge-air cooler 34 from turbocooler 26. The cooling of the charge-air by the cooling air from turbocooler 26 provides the combustion chambers of internal combustion engine 20 with a flow of cool, dense charge-air, permitting more complete combustion of fuel-air mixture, increased power output, reduced noxious emissions, and improved operation, efficiency, and reliability for the internal combustion engine assembly.

As noted above, the cooling air is directed from heat exchanger or oil cooler 25 of the internal combustion engine system to exhaust system portion 23 through exhaust duct means 30. Exhaust system portion 23 may be arranged to provide an ejection action with the greater flow of cooling air at the exhaust duct of turbocooler turbine 26a, thereby mixing the cooling air with the exhaust gas leaving turbine 26a, diluting the exhaust gas, and lowering the back pressure throughout the exhaust system and at the combustion chambers of the engine. The cooling air is preferably ducted to surround the exhaust gas as it is expelled from the exhaust system to provide the exposed surface portions of the exhaust system duct with reduced temperatures. With such systems, the temperature of the exhaust gas being discharged to the atmosphere may be less than 500° F. (260° C.) at maximum engine power. As noted above, the reduction in temperature of the exhaust gas and in surfaces of the exhaust system duct can be an important feature for the application of internal combustion engine systems of this invention to military vehicles as a vehicle employing such a system is less easily detected by infrared sensing devices.

FIG. 2 shows an alternate embodiment of the internal combustion engine system of this invention wherein ambient air enters the internal combustion engine system 10 and passes through charge-air cooler 34 prior to being directed to turbocooler fan means 26b. This embodiment provides the charge-air cooler with ambient air at about its ambient temperature, providing a large difference in the temperatures of the ambient cooling air and the compressed charge-air, thus enhancing the heat transfer in the charge-air cooler and providing a greater temperature reduction of the compressed charge-air. The alternate embodiment of FIG. 2 also includes components to introduce the ambient air directly into the fan means 26b of the turbocooler, bypassing the charge-air cooler 34, for operation in situations where charge-air cooling may not be needed, such as winter conditions in which the ambient air may be sufficiently cool that the use of turbocooled cooling air in a charge-air cooler may be unnecessary.

As shown in FIG. 2, the internal combustion engine system 10 of this alternate embodiment is the same as the internal combustion engine system shown in FIG. 1, except for the means to deliver ambient air to the fan means of the turbocooler and the means for directing cooling air from the fan means of the turbocooler to heat exchanger or oil cooler 25. As shown in FIG. 2, ambient air is drawn into the internal combustion engine system by the action of turbocooler fan means 26b through, if necessary, a coarse air cleaner 27a. The means for directing ambient air to fan means 26b of turbocooler 26 includes two paths. In one such path, the means directs the ambient cooling air through ducts 128a to charge-air cooler 34 and from charge-air cooler 34 through duct work 128c to the inlet of turbocooler fan means 26b. The other path of the means for directing ambient air to the inlet of turbocooler fan means 26b can include a bypass valve 27c and duct 27b, shown in dashed lines, which joins duct 128c at a union 128b.

In the operation of the internal combustion engine system of FIG. 2, bypass valve 27c may be opened, closed, or modulated. When bypass valve 27c is closed, which is normally the case, ambient air is directed through duct 128a to charge-air cooler 34, which is an air-to-air heat exchanger of the kind generally known in the art. The flow of cooling air from duct 128a cools the compressed charge-air in charge-air cooler 34 and is then directed through duct 128c to the inlet of turbocooler fan means 26b. Charge-air cooler 34 may be bypassed, however, by opening bypass valve 27c as may be the case when the ambient air is very cold, such as in winter conditions. With bypass valve 27c open, the cooling air substantially entirely flows through bypass valve 27c and duct 27b to union 128b and duct 128c and is drawn into turbocooler fan means 26b. As shown in FIG. 2, the cooling air is directed from the outlet of turbocooler fan means 26b through a duct 129 to heat exchanger or oil cooler 25 to dissipate the heat generated in operation of internal combustion engine 20. In the same manner as shown in FIG. 1, the cooling air is then directed through duct 30 to exhaust system portion 23 for use in cooling and diluting the exhaust gas expelled from the internal combustion engine.

A still further embodiment of this invention is shown in FIG. 3. The internal combustion engine system 10 of FIG. 3 includes a turbomachine having a compressor and an expander used as a charge-air compressor-expander device to supercool engine charge-air prior to delivery to the cylinders of the internal combustion engine. In this system, charge-air from the turbocharger is cooled by a first charge-air cooler, compressed by the compressor of the charge-air compressor-expander, then cooled again by the second charge-air cooler, and delivered to the expander of the charge-air compressor-expander where it expands, driving the compressor of the charge-air compressor-expander and further cooling the compressed charge-air by the expansion process to provide a flow of cold, compressed charge-air to the cylinders of the internal combustion engine.

Referring specifically now to FIG. 3, exhaust gas from the engine is directed by means including exhaust gas ducts 21 to turbine(s) 32a of turbocharger(s) 32 to drive the compressor(s) 32b of the turbocharger(s). Compressor(s) 32b of turbocharger(s) 32 draw ambient air through a fine-air cleaner 36a and means including input duct 36b to the inputs of compressor(s) 32b. Compressed charge-air is directed from the outputs of compressor(s) 32b through means including duct 33 to a first charge-air cooler 234. First charge-air cooler 234 is an air-to-air heat exchanger which also receives cooling air from turbocooler fan means 26b through cooling air duct 28. The compressed charge-air is cooled by the cooling air in first charge-air cooler 234 and directed through a duct 235 to the input of compressor 236a of a charge-air compressor-expander 236. Compressor 236a of charge-air compressor-expander 236, which is driven by an expander 236b of the charge-air compressor-expander as set forth below, further compresses the cooled charge-air directed to compressor 236a through duct 235, and directs the further compressed charge-air through duct 237 to a second charge-air cooler 238. Second charge-air cooler 238 is also an air-to-air heat exchanger which receives cooling air from turbocooler fan means 26b through the cooling air duct 28. The further compressed charge-air from duct 237 is cooled in second charge-air cooler 238 by the cooling air from cooling air duct 28 and is directed through a further duct 239 to expander 236b of charge-air compressor-expander 236. The cooled, further compressed charge-air from duct 239 expands in expander 236b and drives compressor 236a of charge-air compressor-expander 236. In its expansion through expander 236b of charge-air compressor-expander 236, the charge-air becomes supercooled or cold while maintaining a significant compression above atmospheric pressure and the supercooled, compressed charge-air is directed through duct 35 to the combustion chambers of cylinders 20a of internal combustion engine 20.

As in the systems of FIGS. 1 and 2, after delivering the exhaust gas of the internal combustion engine to turbocharger turbine 32a through exhaust ducts means 21, the exhaust gas is further directed through exhaust duct means 22 to the input of turbocooler turbine 26a. In passing through turbine 26a, the exhaust gas drives turbine 26a and fan means 26b of turbocooler 26, thereby generating the flow of cooling air to charge-air aftercoolers 234 and 238. Furthermore, as set forth in the systems of FIGS. 1 and 2, after leaving charge-air coolers 234 and 238, the cooling air is directed through a cooling air duct means 29 to heat exchanger or oil cooler 25 to cool the coolant or, in the case of an oil-only engine, to cool the oil, and dissipate the heat generated by internal combustion engine 20 during operation. Upon leaving heat exchanger or oil cooler 25, the cooling air is directed through cooling air duct means 30 and is used as described above to cool the engine exhaust that leaves the output of turbine 26a of turbocooler 26.

As shown in the system of FIG. 3, the shaft of turbocooler 26 can drive a high-speed, gear-reduction accessory drive 40, which may provide shaft speed reductions on the order, for example, of 10:1 to 30:1. The output of accessory drive 40 may be used to drive any one or more pumps, generators, or other accessory devices commonly used in internal combustion engine systems.

Figure 4:
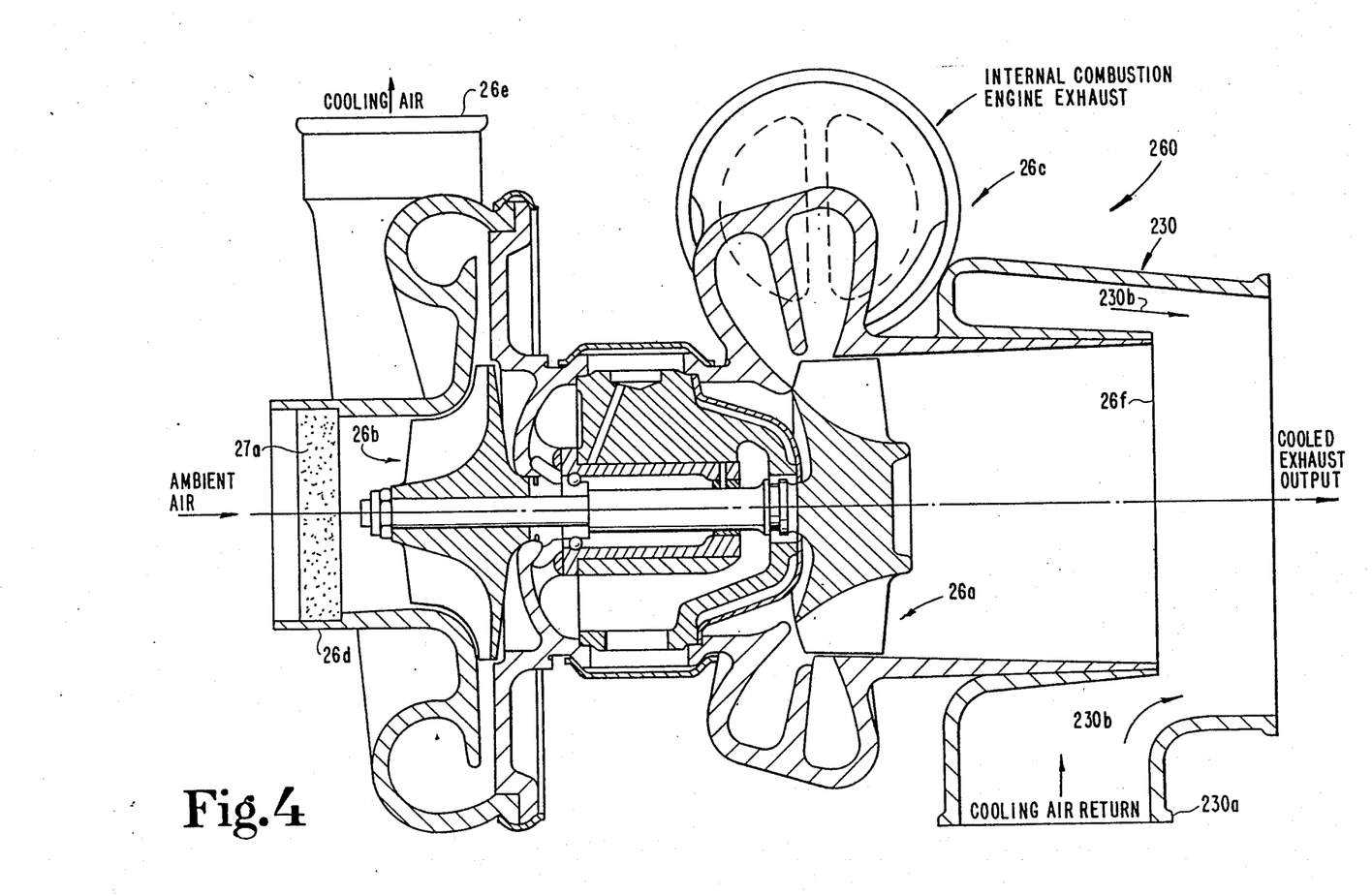
FIG. 4 is a diagrammatic drawing of a turbocooling device of this invention.

FIG. 4 shows a turbocooling device 260 by which the invention may be incorporated into existing internal combustion engine systems. As shown in FIG. 4, turbocooling device 260 includes a turbocooler having a turbine 26a and fan means 26b. Fan means 26b may be designed to produce a high rate of flow of cooling air at a pressure only slightly above atmospheric pressure; for example, a flow of about 150 pounds (0.45 kg.) per minute at about 2 psi. (140 gm/cm$^2$). Turbine inlet 26c is adapted to be connected with the exhaust system of the internal combustion engine; that is, referring to FIGS. 1-3, internal combustion inlet 26c is adapted to be connected to exhaust duct means 22. As shown in FIG. 4, turbine inlet 26c is adapted to direct the exhaust of the internal combustion engine to turbocooler turbine 26a. An inlet 26d is adapted to be connected with ambient air and may be provided with a coarse air filter 27a.

Turbocooling device 260 of FIG. 4 is also provided with an exhaust system portion 230, and the engine exhaust leaving turbine 26a is directed to exhaust system portion 230. Exhaust system portion 230 has an inlet 230a adapted to be connected with a cooling air return which can be ducts 30 as shown in FIGS. 1-3. Exhaust system portion 230 provides a flow of cooling air, as indicated by arrows 230b, which surrounds the engine exhaust leaving turbine 26a and provides an ejector effect, lowering the back pressure at an exit 26f of turbocooler turbine 26a. The addition of cooling air, indicated by arrows 230b, surrounding the flow of engine exhaust gas from outlet 26f of turbine 26a substantially reduces the temperature of the engine exhaust, for example, to temperatures below 500° F. (260° C.) and maintains substantial reduction in the temperature of the outer surfaces of exhaust system portion 230.

The cooling air flow generated by turbocooling device 260 is generally of the order of four times the engine air flow in quantity and the expelling of the resultant mixed flow by exhaust system portion 230 is believed to produce a thrust force on the vehicle in which the invention is incorporated in a direction opposite the direction of expulsion. This additional power output will add to the overall engine output by increasing vehicle speed, reducing engine fuel consumption, or both.

The invention also provides a system of turbocompounding that permits both the turbochargers and the turbocooler to be optimally designed for their applications. The addition of the turbocooler in internal combustion engine systems of the invention has little or no effect on the transient operation of the internal combustion engine turbochargers. The turbochargers receive the exhaust gas energy prior to the turbocooler and thus can operate and accelerate independently from the turbocooler. The turbochargers for use in systems of the invention may be designed for lowest inertia and highest efficiency since there is no requirement for the addition of a cooling air portion as described in U.S. Pat. No. 3,829,235, or by an additional compressor wheel on the turbocharger shaft to provide the additional cooling air flow. The modification of the turbocharger to provide cooling air flow as described in U.S. Pat. No. 3,829,235 or by the addition of an additional compressor wheel complicates the design of the turbocharger, increases its rotational inertia, decreases its acceleration, and reduces the efficiency of the turbocharger.

The invention provides a means of turbocompounding without the use of reduction gears, and the addition of a turbocooler as in the internal combustion engine systems of the invention allows all of the turbomachines to be designed for optimum performance in their application and to be optimized for highest efficiency. For example, the overall efficiency of a turbocooler 26 of this invention should exceed fifty percent, which is twice the twenty-five percent efficiency obtained with conventional, engine-driven, cooling fans. The fan section of the turbocooler may be designed to provide a low-pressure, high-volume flow of cooling air to the heat exchanger of the internal combustion engine. In such designs, the turbocooler can operate at lower blade tip speeds than the turbocharger and thus achieve high efficiency.

A number of different regulation systems may be incorporated into systems of this invention to vary the volume of cooling air flow generated by the turbocooler. Such regulation systems may include variable inlet guide vanes, variable area turbines, waste gate valves, pressure relief or throttling valves, and the like. In some applications, the turbocooler may operate without regulation since the exhaust gas energy increases as the engine output increases and the cooling air requirement increases; thus, the turbocooler receives greater power from the increased exhaust gas energy and produces a greater volume of cooling air at the same time as the internal combustion engine needs increased flows of cooling air to dissipate the higher heat losses generated by the engine during periods of higher engine output. The regulating systems for cooling air may also be provided with inputs proportional to the temperature of ambient air.

Figure 5:
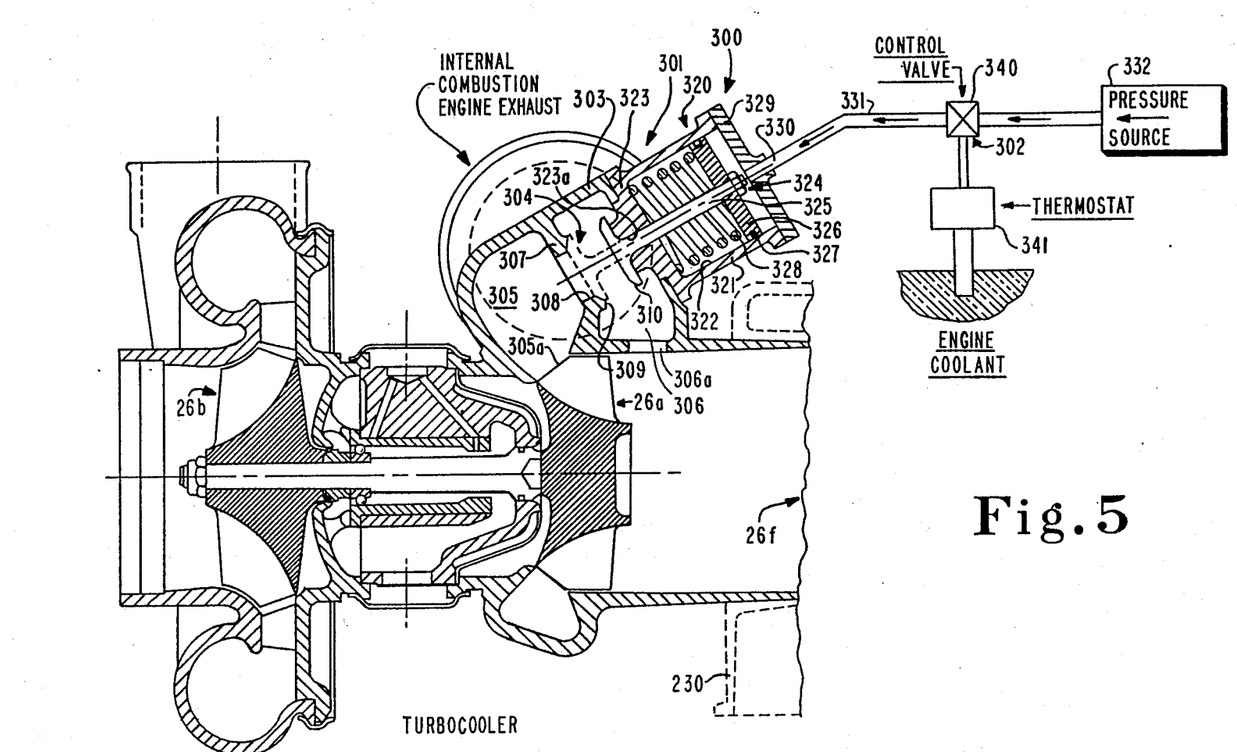
FIG. 5 is a diagrammatic drawing of a turbocooling device of this invention incorporating a cooling air flow controlling means.

One such regulation system that may be incorporated into a system of this invention is shown in FIG. 5. In this preferred embodiment, the regulation means comprises means 300 for controlling the cooling air generated by the turbocooler fan means 26c. Control means 300 includes means 301 for controlling the volume of exhaust gas driving the turbine 26a of the turbocooler, and activating means 302 for the controlling means 301. The control means 300, as shown in FIG. 5, comprises a turbine housing 303 having a valved passageway 304 adapted to permit exhaust gas to bypass the turbine 26a of the turbocooler, and control 302 responsive to the operating conditions of the internal combustion engine to operate the valved passageway 304 of the turbocooler turbine housing 303.

Means 301 preferably includes turbocooler turbine housing 303 forming first annular chamber, 305 and second chamber 306. The first annular chamber 305 is positioned adjacent the second chamber 306 with dividing wall 307 positioned therebetween. The first annular chamber 305 has exit port 305a directing exhaust gas to turbine 26a. The annular chamber 306 has exit port 306a directing exhaust gas to the turbocooler exit 26f. A valve port 308 is positioned in dividing wall 307. Valve port 308 is provided with a flanged collar 309. Controlling means 301 further includes a movable valve head 310 traversable between wall 323a of second chamber 306 and dividing wall 307. In one position (shown in phantom lines in FIG. 5), valve head 310 blocks valve port 308, thereby directing the exhaust gas delivered to the first annular chamber 305 through port 305a to act upon turbine 26a. Turbine 26a drives the turbocooler fan means 26c generating the cooling air flow required for the cooling of the engine. In its other position (shown in solid lines in FIG. 5), valve head 310 abuts wall 323 of chamber 306. When valve head 310 is in this "open" position, the exhaust gas is diverted from the first annular chamber 305, through valve port 308 and into the second chamber 306 and outwardly therefrom through exit port 306a to turbocooler exit port 26f, thereby bypassing turbine 26a of the turbocooler. With the exhaust gas thus bypassing turbine 26a, a substantially reduced flow of cooling air is generated. Valve head 310 and valve port 308 thus form a waste gate within the turbocooler turbine housing 303.

Control means 301 further includes a means 320 to operate the valve head 310. As shown in FIG. 5, means 320 can comprise a cylinder housing 321 connected with turbocooler turbine housing 303. Cylinder housing 321 forms a cylinder 322. Wall 323 forms a bearing opening 323a. A piston 324 is formed by a piston rod 325 and piston head 326 located within cylinder 322. Piston rod 325 is slidably carried within bearing opening 323a, and piston head 326 is in sealed engagement with the walls 322 of the cylinder by use of an O-ring 327. Piston rod 325 extends outside of the walls of means 320 and is connected with valve head 310 in chamber 306. An energy storage mechanism such as spring 328 is connected with piston 324 and the walls of means 320 to exert force on piston 324. As shown in FIG. 5, a spring 328 can be connected between piston head 326 and wall 323 to hold valve head 310 in the open position. As further shown in FIG. 5, the wall 329 of means 320 is provided with an orifice 330 adapted to be connected with a source of fluid pressure from the internal combustion engine. The orifice 330 is located in the walls of means 320 to permit the application of fluid pressure to the piston head in a direction to overcome the force exerted by the energy storage device 328 and to move the valve head 310 into engagement with valve port 308, closing the waste gate.

The orifice 330 of waste gate operating means 320 is connected by a fluid line 331 with a source 332 of fluid pressure from the internal combustion engine. A control valve 340 is positioned between pressure source 332 and cylinder housing 303 and is adapted to control the fluid pressure delivered to the cylinder housing 303. Pressure produced by the engine pressure source 332 may comprise boost pressure produced by engine turbochargers or engine oil pressure.

Activating means 302 may comprise, for example, a device 341 adapted to sense the temperature of the coolant employed by the engine and direct an operational signal to control valve means 340 when the engine coolant temperature reaches a predetermined level.

With valve head 310 in the open position, shown as solid lines in FIG. 5, engine exhaust gas directed to turbocooler can flow from first annular chamber 305 through valve port 308 into the second chamber 306 and outwardly from chamber 306 through exit port 306a to be expelled through exit 26f of the turbocooler, thus bypassing turbine 26a and providing little driving force to the turbocooler fan 26b during periods of low temperature operation.

As the engine operating temperature increases and the engine needs increased cooling, and when the engine coolant, for example, increases to a preselected level, activating means 302 will open control valve 340 allowing fluid pressure to be directed by connecting means 331 to cylinder housing 303. Where engine boost pressure is used as the operating fluid pressure, the engine turbocharger will be also operating at an increased speed, thereby providing satisfactory boost pressure. With valving means 340 opened, the fluid pressure will increase within the walls of cylinder 322 between orifice 330 and the piston head 326 and will overcome the force exerted by spring 328, thereby urging piston head 326 and piston rod 325 outwardly from cylinder 322 and driving valve head 310 towards and into engagement with valve port 308. When valve head 310 engages the valve seat formed in flanged collar 309 of valve port 308, the engine exhaust gas flows from the first annular chamber orifice 305a and acts upon turbine 26a, driving the fan of the turbocooler, providing the cooling air flow to cool the engine and dissipating heat generated by the engine during periods of high engine load. Activating means 302 may be adapted to vary the volume of the cooling air flow generated by the turbocooler by varying the fluid pressure applied to cylinder housing 303, thereby variably opening and closing the waste gate formed by valve head 310 and valve port 308 to maintain the engine coolant temperature within defined limits.

The turbocooler shown in FIG. 5 can also be provided with a cooling air return 230 (shown in phantom lines in FIG. 5) to direct cooling air around the turbine exhaust, permit mixing of the turbine exhaust with the cooling air prior to their expulsion, and provide a thrust force usable as motive force.

Of course, this invention can be embodied in forms other than the one as shown in the drawings and described above, for example, by rearranging the valve and valve seat with respect to the engine exhaust system, or by possibly removing the valve and valve seat from the turbocooler assembly.

The invention thus provides a method of cooling an internal combustion engine using the exhaust gas of the engine, and directing the exhaust gas from the engine to a turbocooler having a turbine and a fan means, driving the turbine and fan means of the turbocooler with the engine exhaust gas, directing ambient air into the turbine-driven fan means of the turbocooler, generating a flow of cooling air with the turbine-driven fan means of the turbocooler, directing the cooling air from the fan means of the turbocooler device to a heat exchanger connected with the internal combustion engine to receive heated coolant from the engine, and cooling of the heated coolant by the cooling air from the turbocooler. In turbocharged engine systems, the exhaust gas is directed to a turbocharger or turbochargers to drive the turbine(s) and compressor(s) of the turbocharger(s); and ambient air is directed to the compressor(s) of the turbocharger(s) and compressed by the compressor(s) of the turbocharger(s) to create charge-air for the engine. The compressed charge-air is directed from the turbocharger compressor(s) to one or more charge-air coolers, and the compressed charge-air is cooled by a flow of cooling air urged through the charge-air cooler(s) by the turbocooler fan means, thus permitting cooled, compressed charge-air to be directed into the engine cylinders for combustion.

The method provided by this invention may further include controlling the cooling air flow generated by the turbine-driven fan means of the turbocooler by controlling the volume of exhaust gas acting on the turbine and driving the fan means.

Furthermore, the invention provides an oil-only, internal combustion engine system by providing a flow of lubricant to the internal combustion engine as the only fluid to lubricant and to cool the engine, directing the flow of the heated lubricant from the internal combustion engine to an oil cooler for cooling, cooling the heated lubricant with the flow of cooling air from the turbocooler fan means, and directing the cooled lubricant back to the internal combustion engine to lubricate and cool the engine. Moreover, in methods of the invention, the output of an engine exhaust system can be cooled by directing the cooling air back to the exhaust system, and using the cooling air, preferably by mixing the cooling air and engine exhaust gas, in the exhaust system to cool the exhaust gas prior to its release and to reduce the temperatures of the downstream exhaust system components.

Also, the invention provides a system to control the cooling air flow generated by the turbocooler. During periods of low engine output, little cooling air flow is needed and the regulation means diverts the exhaust gas around, and bypassing, the turbocooler turbine thereby providing no driving force to the turbocooler compressor and, consequently, little cooling air flow is generated. During periods of high engine output, greater cooling air flow is needed and the regulation means causes the exhaust gas to act upon the turbocooler turbine thereby driving the fan means and producing the necessary cooling air flow.

Thus, the invention provides the methods and apparatus disclosed above in connection with the preferred internal combustion engine system embodiments of FIGS. 1–5. It must be understood, however, that there are other embodiments and variations of the invention which may be developed and that the invention is not limited to the preferred embodiments and best mode of operation currently understood, but is only to be limited by the scope of the following claims.

We claim:
1. An internal combustion engine system with an exhaust-driven, cooling system, comprising:
a multi-cylinder, internal combustion-engine assembly;
means for providing a mixture of fuel and air to the internal combustion engine assembly;

mean for carrying exhaust gas from the internal combustion engine assembly;

means for providing a flow of coolant to and from the internal combustion engine assembly for cooling the internal combustion engine assembly and for carrying heat generated by operation of the internal combustion engine assembly away from the internal combustion engine assembly;

a heat exchanger, connected with said means for providing a flow of coolant, to dissipate the heat carried by said coolant from the internal combustion engine assembly prior to its return to the internal combustion engine assembly;

a turbocooler having a turbine connected with the means for carrying exhaust gas from the internal combustion engine assembly so that the exhaust gas carried from the internal combustion engine assembly by said exhaust means drives the turbine of the turbocooler, said turbocooler also having a ducted fan means driven by the turbine of the turbocooler, said ducted fan means communicating with atmosphere and generating a ducted flow of cooling air;

means for directing the ducted flow of cooling air generated by the ducted fan means of said turbocooler through the heat exchanger to cool the coolant and dissipate the heat generated in operation of the internal combustion engine assembly; and means for controlling the cooling air flow generated by said turbocooler ducted fan means, comprising:

means for controlling the volume of exhaust gas driving the turbine of said turbocooler, including:

a turbocooler turbine housing defining a first annular chamber and a second chamber, said chambers having a dividing wall positioned therebetween, said first annular chamber having an exit port directing exhaust gas to the turbocooler turbine, said second chamber having an exit port directing exhaust gas to the turbocooler exit;

a valve port in said dividing wall, said valve port forming a valve seat;

a valve head movable with respect to the valve seat in said dividing wall, said valve head blocking said valve port in one position, thereby directing the exhaust gas from said first annular chamber to act upon the turbine of said turbocooler, and being spaced from said valve seat in another position, thereby diverting the exhaust gas into said second chamber and outwardly from said second chamber through said turbocooler exit, thereby bypassing the turbine of said turbocooler;

means to operate said valve head including a cylinder housing connected with said turbocooler turbine housing at one end, the walls of said cylinder housing forming a cylinder with a wall at the other end forming a bearing opening; a piston formed by a piston rod carried within said bearing opening and a piston head within said cylinder in sealing engagement with walls forming the cylinder, said valve head being carried by said piston rod outside of said cylinder; an energy storing mechanism within said cylinder and acting on said piston rod to urge the valve head in one direction; a further orifice in the cylinder housing walls forming said cylinder to permit the application of fluid pressure to said piston head to overcome the energy of said energy storage device and move the piston head, piston rod and valve head in the other direction; and means for activating said controlling means, including:

means connecting said cylinder wall orifice with a source of fluid pressure of the internal combustion engine;

a control valve located in said pressure connecting means adapted to control the pressure delivered to said cylinder housing; and control valve activating means being adapted to operate said control valve in response to engine operating conditions whereby said control valve operates to admit pressure through said pressure connecting means to said cylinder housing to operate said valve head in response to engine operating conditions.

2. A method of providing cooling for an internal combustion engine using the exhaust gas of the engine, comprising:

directing the exhaust gas from said engine to a turbocooling device having a turbine and a ducted fan means;

driving the turbine and ducted fan means of the turbocooling device with the exhaust gas of the internal combustion engine;

directing ambient air to the turbine-driven ducted fan means of the turbocooling device;

generating a ducted flow of cooling air with said turbine-driven ducted fan means;

directing the ducted flow of cooling air from said ducted fan means of the turbocooler to a heat exchanger connected with said internal combustion engine to receive heated coolant from the internal combustion engine;

cooling said heated coolant with the ducted cooling air from said turbocooler; and controlling the ducted cooling air generated with said turbine-driven ducted fan means by controlling the volume of exhaust gas driving the turbine and the ducted fan means of said turbocooling device, thereby controlling the driving force provided to the ducted fan means and controlling the flow of cooling air generated by said ducted fan means, said step of controlling the volume of exhaust gas driving the turbine and the ducted fan means of said turbocooling device comprising the steps of:

determining engine cooling needs by sensing engine coolant temperature;

delivering pressure produced by an engine pressure source to a turbocooling control device when said temperature is at one predetermined level; and blocking the delivery of said pressure to said turbocooling control device when said temperature is at another predetermined level, said turbocooling control device directing the exhaust gas to act upon the turbine of said turbocooling device when said engine system requires cooling, thereby driving the ducted fan means and generating the ducted flow of cooling air, and diverting exhaust gas around the turbine of said turbocooling device when said engine requires reduced cooling, thereby providing reduced driving force to the ducted fan means and reduced ducted cooling air flow.

3. The method of providing cooling for an internal combustion engine of claim 2 wherein said pressure is delivered from engine boost pressure.

4. The method of providing cooling for an internal combustion engine of claim 2 wherein said pressure is delivered from engine oil pressure.

5. The method of providing cooling for an internal combustion engine of claim 2, further comprising:
   driving the turbine portion of a turbocharger with the exhaust gas, thereby driving the compressor portion of the turbocharger;
   compressing ambient air with the compressor of said turbocharger, thereby generating a flow of charge-air for introduction into said engine;
   directing said compressed charge-air through a first charge-air cooling means;
   directing a ducted flow of cooling air through said first charge-air cooling means, thereby lowering the temperature of said charge air;
   compressing said charge-air further with a compressor of a compressor-expander device;
   directing said further compressed charge-air through a second charge-air cooling means;
   directing a ducted flow of cooling air through said second charge-air cooling means, thereby lowering the temperature of said further compressed charge-air;
   directing said cooled, further compressed charge-air from said second charge-air cooling means to an expander of the compressor-expander device;
   expanding the cooled, further compressed charge-air with the expander of said compressor-expander device to further cool said cooled, further compressed charge-air; and
   introducing said further cooled, compressed charge-air into said internal combustion engine.

6. An internal combustion engine system with an exhaust-driven, cooling system, comprising:
   a multi-cylinder internal combustion engine assembly;
   means for carrying an exhaust gas from the internal combustion engine assembly;
   means for providing a flow of coolant to and from the internal combustion engine assembly for carrying heat generated by operation of the internal combustion engine assembly away from the internal combustion engine assembly;
   a heat exchanger, connected with said means for providing a flow of coolant to and from the internal combustion engine, to dissipate the heat carried by said coolant from the internal combustion engine assembly prior to its return to the internal combustion engine assembly;
   a turbocooler having an exhaust-driven ducted fan means for generating a flow of cooling air;
   means to direct the flow of cooling air generated by the exhaust-driven ducted fan means of said turbocooler through the heat exchanger to cool the coolant and dissipate the heat losses generated by the internal combustion engine assembly; and
   means for controlling the cooling air generated by the exhaust-driven ducted fan means of said turbocooler, comprising
   means for controlling the volume of the exhaust gas driving the ducted fan means of said turbocooler,
   a pressure source,
   means for delivering pressure produced by said source to operate said controlling means;
   a control valve means adapted to control the pressure delivered to said controlling means, and
   a device to sense engine temperature connected with said control valve,
   said temperature sensing device operating said control valve when said temperature reaches a predetermined level thereby operating said means for controlling the volume of the exhaust gas driving the ducted fan means of the turbocooler.

7. The internal combustion engine system of claim 6 wherein said fluid pressure source comprises engine boost pressure.

8. The internal combustion engine system of claim 6 wherein said fluid pressure source comprises engine oil pressure.

9. The internal combustion engine system of claim 6 wherein said control valve activating means comprises a thermostatic device adapted to sense engine coolant temperature and to produce an output operating the control valve means when said temperature reaches a predetermined level.

10. An internal combustion engine assembly, comprising:
    a multi-cylinder internal combustion engine producing exhaust gas;
    means for providing flows of a plurality of fluids in operation of the internal combustion engine assembly;
    means for carrying the exhaust gas from the internal combustion engine;
    a turbocooler communicating with said means for carrying the exhaust gas and including ducted fan means driven by said exhaust gas for generating a ducted flow of cooling air;
    a plurality of heat exchangers connected with said means for providing flows of a plurality of fluids, with a separate heat exchanger for each of said plurality of fluids;
    conduit means to direct the ducted cooling air from said ducted fan means of said turbocooler through each of the plurality of heat exchangers to cool each of the plurality of fluids provided in operation of the internal combustion engine assembly; and
    means for controlling the ducted cooling air flow generated by said turbocooler ducted fan means.

11. The internal combustion engine assembly of claim 10 wherein said means for providing flows of a plurality of fluids comprise means providing a flow of coolant for the internal combustion engine and means providing a flow of charge-air for the cylinders of the internal combustion engine.

* * * * *